United States Patent [19]

Blackwell

[11] Patent Number: 5,439,235

[45] Date of Patent: Aug. 8, 1995

[54] APPARATUS FOR COUPLING CONCENTRIC CYLINDRICAL MEMBERS THROUGH THE SELECTIVE RADIAL ENLARGEMENT OF ONE OF THE COUPLING COMPONENTS

[76] Inventor: William R. Blackwell, 2168 Sunset Dr. NE., New Philadelphia, Ohio 44663-7012

[21] Appl. No.: 251,199

[22] Filed: May 31, 1994

[51] Int. Cl.$^6$ ............................................. B23B 31/40
[52] U.S. Cl. ................................... 279/2.15; 242/573; 294/94
[58] Field of Search .................... 279/2.12, 2.14, 2.15, 279/2.03; 242/571-573, 573.1, 573.2, 573.8; 294/93-95; 414/746.5, 910

[56] References Cited

U.S. PATENT DOCUMENTS 3,704,837 12/1972 Heinz et al. ..................... 279/2.12

Primary Examiner—Steven C. Bishop

[57] ABSTRACT

An apparatus for coupling concentric cylindrical members through the selective radial enlargement of one of the coupling components comprising a fixed collar having a cylindrical interior bore of a common diameter and with an exterior cross section of varying diameters. The apparatus further includes an adjustable component which has an upper half and a lower half and a central bore extending therethrough with an inboard end forming a flange of an intermediate diameter positionable over the intermediate section of the collar and having a enlarged diameter thereadjacent for being positioned over the outboard section of the collar and having an outboardly tapering intermediate section with its greatest diameter at the outboard end and its smallest diameter at its inboard end joining at its inboard end with the enlarged diameter. The adjustable member is provided with at least one annular groove on its exterior surface, The apparatus further includes an actuator rod located through the bores of the fixed collar and the adjustable component. The actuator rod has an outboard end with a circular cross section of an increased diameter and has downwardly tapering surfaces forwardly and rearwardly thereof. The rearward taper reduces to a diameter equal to the exterior diameter of the remainder of the rod.

4 Claims, 3 Drawing Sheets 5,439,235

APPARATUS FOR COUPLING CONCENTRIC CYLINDRICAL MEMBERS THROUGH THE SELECTIVE RADIAL ENLARGEMENT OF ONE OF THE COUPLING COMPONENTS

BACKGROUND OF THE INVENTION

1. Field of the Invention

The present invention relates to apparatus for coupling concentric cylindrical members through the selective radial enlargement of one of the coupling components and more particularly pertains to increasing or decreasing the diameter of an interior cylindrical component to effect its coupling with an exterior cylindrical component.

2. Description of the Prior Art

The use of various attachment devices in the machine tool arts is known in the prior art. More specifically, various attachment devices in the machine tool arts heretofore devised and utilized for the purpose of effecting a releasable coupling between two cylindrical components are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,420,539 to Pahlitzsch et al discloses a manually operable chuck for lathes and other machine tools.

U.S. Pat. No. 3,635,481 to Hiestand discloses a chuck for machine tools.

U.S. Pat. No. 4,799,837 to Vollmer discloses a multicomponent chucking system particularly for rotary machine tools, such as drills, boring tools, boring mills and the like.

U.S. Pat. No. 4,969,654 to Theodolin discloses a clamping chuck for a machine tool.

Lastly, U.S. Pat. No. 5,158,307 to Toyano et al discloses a chuck for machine tools.

In this respect, the apparatus for coupling concentric cylindrical members through the selective radial enlargement of one of the coupling components according to the present invention substantially departs from the conventional concepts and designs of the prior art, and in doing so provides an apparatus primarily developed for the purpose of increasing or decreasing the diameter of an interior cylindrical component to effect its coupling with an exterior cylindrical component.

Therefore, it can be appreciated that there exists a continuing need for new and improved apparatus for coupling concentric cylindrical members through the selective radial enlargement of one of the coupling components which can be used for increasing or decreasing the diameter of an interior cylindrical component to effect its coupling with an exterior cylindrical component. In this regard, the present invention substantially fulfills this need.

SUMMARY OF THE INVENTION

In view of the foregoing disadvantages inherent in the known types of various attachment devices in the machine tool arts now present in the prior art, the present invention provides an improved apparatus for coupling concentric cylindrical members through the selective radial enlargement of one of the coupling components. As such, the general purpose of the present invention, which will be described subsequently in greater detail, is to provide a new and improved apparatus for coupling concentric cylindrical members through the selective radial enlargement of one of the coupling components and method which has all the advantages of the prior art and none of the disadvantages.

To attain this, the present invention essentially comprises a new and improved apparatus for coupling concentric cylindrical members through the selective radial enlargement of one of the coupling components comprising, in combination a fixed collar having a cylindrical interior bore of a common diameter and with an exterior cross section of varying diameters, the exterior inboard section being of a large diameter, the exterior outboard section being of an intermediate diameter and the exterior intermediate section being of a small diameter, the fixed collar being fabricated of carbon steel and having a plurality of apertures in a circular configuration extending through the inboard section. The device further including an adjustable component having an upper half and a lower half and a central bore extending therethrough with an inboard end forming a flange of an intermediate diameter positionable over the intermediate section of the collar and having a enlarged diameter thereadjacent for being positioned over the outboard section of the collar and having an outboardly tapering intermediate section with its greatest diameter at the outboard end and its smallest diameter at its inboard end joining at its inboard end with the enlarged diameter, the tapered section including an intermediate part of a greater diameter than the sections of the tapering section on opposite sides thereof, the adjustable member being provided with annular grooves on its exterior surface extending from the outboard end to an intermediate location. The device further including an actuator rod located through the bores of the fixed collar and the adjustable component, the actuator rod having an outboard end with a circular cross section of an increased diameter and having downwardly tapering surfaces forwardly and rearwardly thereof, the rearward taper reducing to a diameter equal to the exterior diameter of the remainder of the rod whereby relative axial movement between the rod and to the fixed collar and the adjustable component will allow the tapered surface of the rod to interact with the tapered surface of the adjustable component to effect the increasing and decreasing of its diameter. The apparatus further including an elastic garter spring in an annular configuration positionable in at least one of the grooves of the adjustable component to provide a retarding force to the rapid expansion thereof under the influence of the actuator rod. The apparatus further including attachment bolts extending through the collar and threadedly received in threaded apertures of the adjustable component for attachment therebetween.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved apparatus for coupling concentric cylindrical members through the selective radial enlargement of one of the coupling components which have all the advantages of the prior art various attachment devices in the machine tool arts and none of the disadvantages.

It is another object of the present invention to provide new and improved apparatus for coupling concentric cylindrical members through the selective radial enlargement of one of the coupling components which may be easily and efficiently manufactured and marketed.

It is further object of the present invention to provide new and improved apparatus for coupling concentric cylindrical members through the selective radial enlargement of one of the coupling components which are of durable and reliable constructions.

An even further object of the present invention is to provide new and improved apparatus for coupling concentric cylindrical members through the selective radial enlargement of one of the coupling components which are susceptible of a low cost of manufacture with regard to both materials and labor, and which accordingly are then susceptible of low prices of sale to the consuming public, thereby making such apparatus for coupling concentric cylindrical members through the selective radial enlargement of one of the coupling components economically available to the buying public.

Still yet another object of the present invention is to provide new and improved apparatus for coupling concentric cylindrical members through the selective radial enlargement of one of the coupling components which provide in the apparatuses and methods of the prior art some of the advantages thereof, while simultaneously overcoming some of the disadvantages normally associated therewith.

Even still another object of the present invention is to increase or decrease the diameter of an interior cylindrical component to effect its coupling with an exterior cylindrical component.

Lastly, it is an object of the present invention to provide a new and improved apparatus for coupling concentric cylindrical members through the selective radial enlargement of one of the coupling components comprising a fixed collar having a cylindrical interior bore of a common diameter and with an exterior cross section of varying diameters. The exterior inboard section is of a large diameter. The exterior outboard section is of an intermediate diameter and the exterior intermediate section is of a small diameter. The fixed collar has a plurality of apertures in a circular configuration extending through the inboard section. The device further includes an adjustable component which has an upper half and a lower half and a central bore extending therethrough with an inboard end forming a flange of an intermediate diameter positionable over the intermediate section of the collar and having a enlarged diameter thereadjacent for being positioned over the outboard section of the collar and having an outboardly tapering intermediate section with its greatest diameter at the outboard end and its smallest diameter at its inboard end joining at its inboard end with the enlarged diameter. The tapered section includes an intermediate part of a greater diameter than the sections of the tapering section on opposite sides thereof. The adjustable member is provided with at least one annular groove on its exterior surface. The device further includes an actuator rod located through the bores of the fixed collar and the adjustable component. The actuator rod has an outboard end with a circular cross section of an increased diameter and has downwardly tapering surfaces forwardly and rearwardly thereof. The rearward taper reduces to a diameter equal to the exterior diameter of the remainder of the rod.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
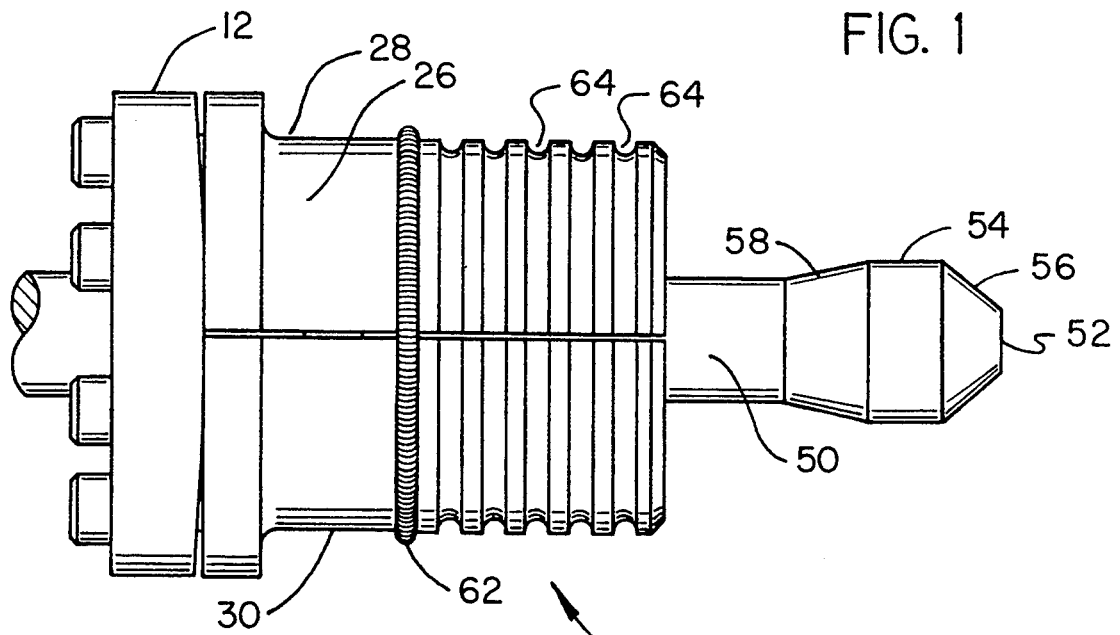
FIG. 1 is a perspective view of the preferred embodiment of the apparatus for coupling concentric cylindrical members through the selective radial enlargement of one of the coupling components constructed in accordance with the principles of the present invention.
Figure 2:
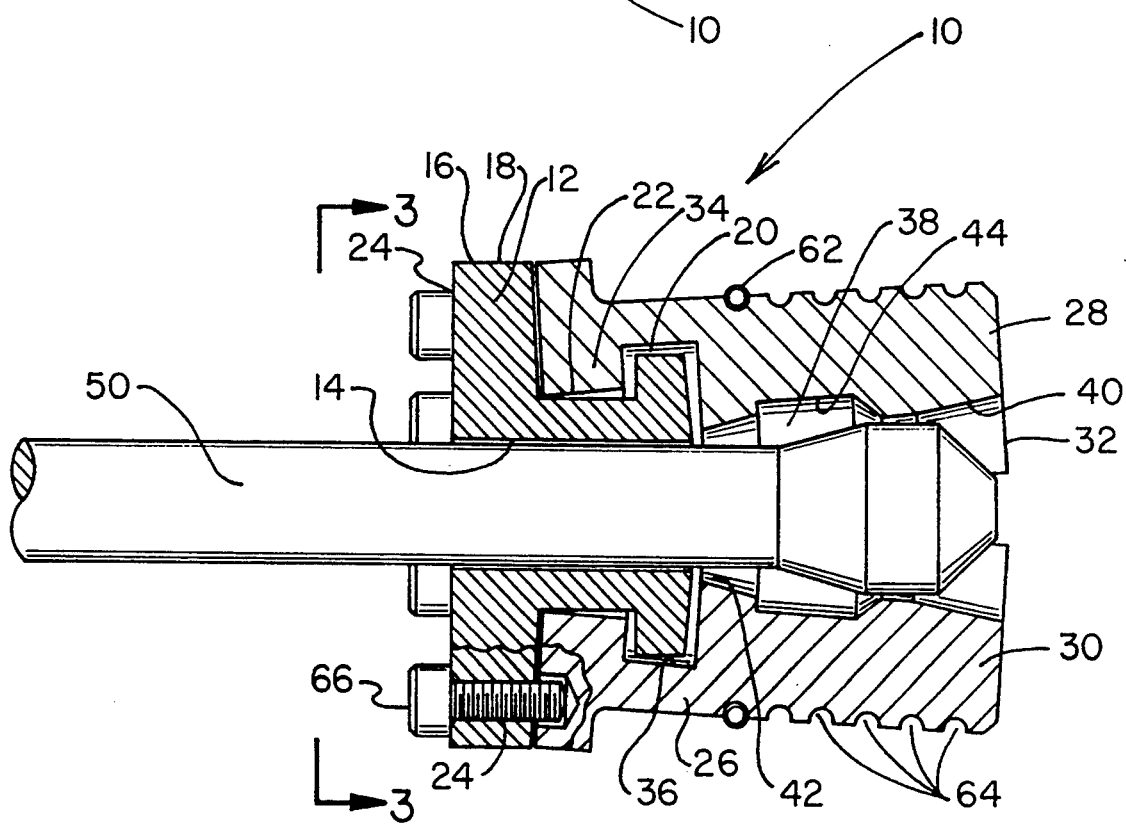
FIG. 2 is a cross sectional view of the device shown in FIG. 1 taken along the longitudinal axis thereof but with the jaws in the expanded orientation.
Figure 3:
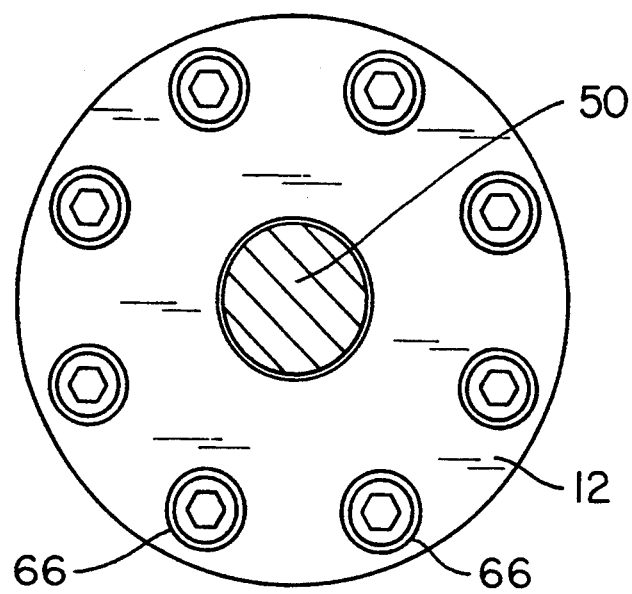
FIG. 3 is a cross sectional view of the device of the prior Figures taken along line 3—3 of FIG. 2.
Figure 4:
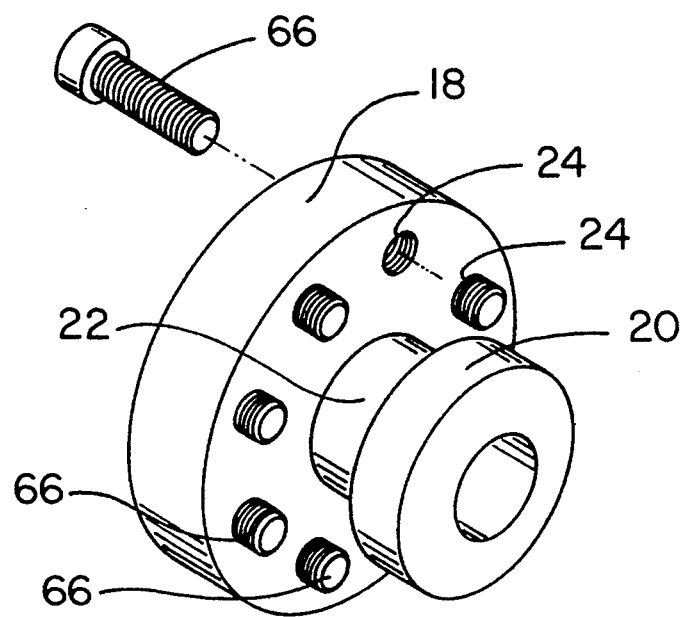
FIG. 4 is a perspective view of the fixed component of the device shown in FIGS. 1 through 3.
Figure 5:
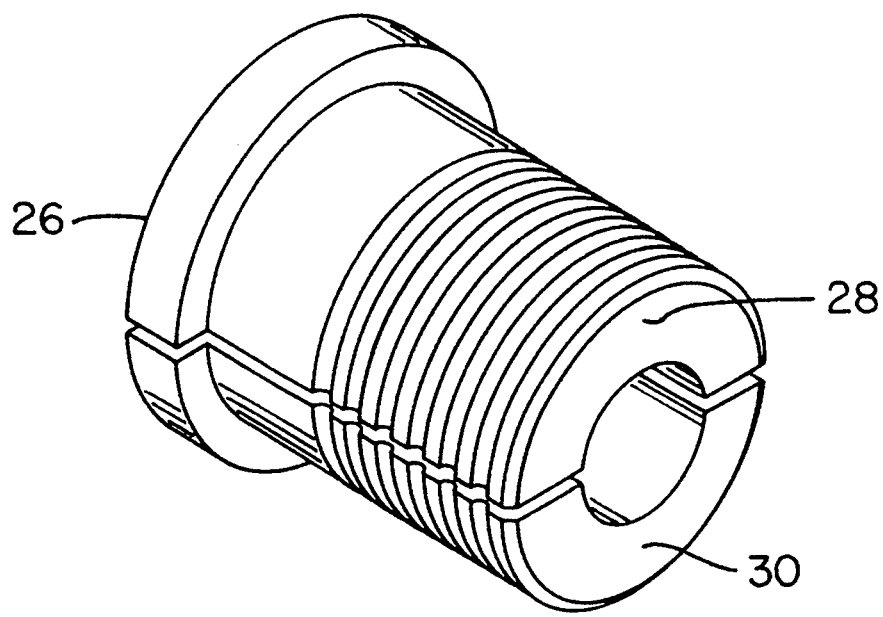
FIG. 5 is a perspective view of the adjustable component shown in FIGS. 1 through 3.
Figure 6:
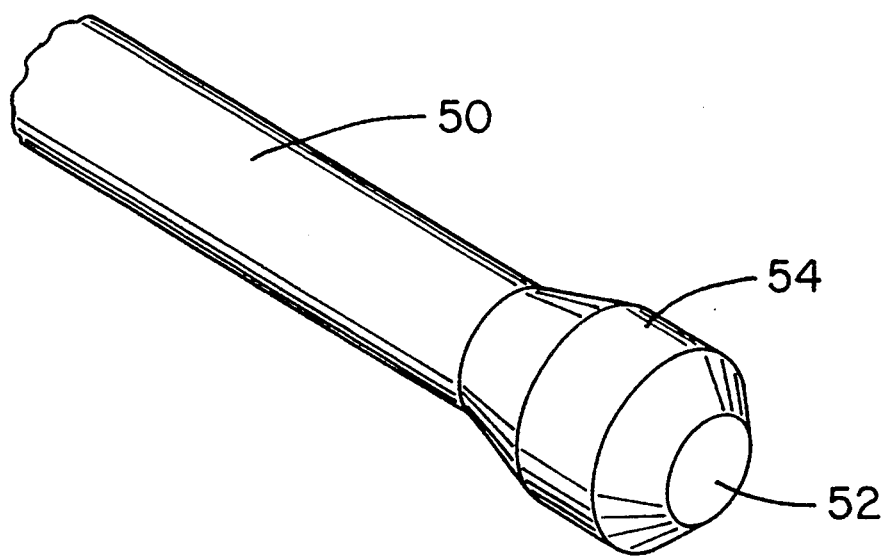
FIG. 6 is a perspective view of the actuator rod shown in the device of FIGS. 1 through 3.

With reference now to the drawings, and in particular to FIG. 1 thereof, the preferred embodiment of the new and improved apparatus for coupling concentric cylindrical members through the selective radial enlargement of one of the coupling components embodying the principles and concepts of the present invention and generally designated by the reference numeral 10 will be described.

The present invention is in a system or apparatus 10 comprised of a plurality of component elements. Such component elements, in their broadest context, include a fixed collar, an adjustable component, an actuator rod, a garter spring and attachment bolts. Such components are individually configured and correlated with respect to each other as to attain the desired objective.

More specifically, the central component of the system 10 is a fixed collar 12. The collar has a cylindrical interior bore 14 of a common diameter throughout. It has an exterior cross section 16 of varying diameters. The interior inboard section 18 is of a large diameter. The exterior outboard section 20 is of an intermediate diameter. The exterior intermediate section 22 is of a small diameter. The collar is preferably fabricated of a rigid material as for example carbon steel. It is also provided with a plurality of apertures 24 in a circular configuration extending through the inboard section in radial directions.

The next major component of the system 10 is an adjustable component 26. Such component is formed of an upper half 28 and a lower half 30. The halves are of similar configuration to make a cylindrical member. The adjustable component has a central bore 32 extending therethrough. It has an inboard end which forms a flange 34 of an intermediate diameter. This is positionable over the intermediate section of the collar. The adjustable component also has an enlarge diameter 36 thereadjacent for being positioned over the outboard section of the collar. The adjustable component also has an outboardly tapering intermediate section 38 with its greatest diameter at the outboard end 40 and its smallest diameter at its inboard end 42. At this location it joins with the inboard end with the enlarged diameter. The tapering section also includes an intermediate part 44 of a greater diameter than the section of the tapering section on opposite sides thereof. The adjustable member is also rigid, preferably fabricated of carbon steel. It is provided on its exterior surface with annular grooves which extend from the outboard end to an intermediate location.

The next major component of the system 10 is an actuator rod 50. The actuator rod is located through the bores of the fixed collar and the adjustable component. The actuator rod has an outboard end 52 with a circular cross section of an increased diameter 54. It has downwardly tapering surfaces 56 and 58 forwardly and rearwardly thereof. The rearward taper reduces to a diameter equal to the exterior diameter of the remainder of the rod. In this manner, relative axial movement between the rod and the fixed collar and the adjustable component will allow the tapered surface of the rod to interact with the tapered surface of the adjustable component. This will effect the increase and decrease of the diameter of the adjustable component. This is through a ramp action therebetween.

Coupling of the two halves of the adjustable component is through an elastic garter spring 62. Such spring is in an annular configuration. It is positionable in at least one of the grooves 64 of the adjustable component. In certain circumstances a plurality of such garter springs may be utilized. The garter spring or springs function to provide a retarding force to the radial expansion of the adjustable member under the influence of the actuator rod tending to enlarge the diameter of the adjustable component through axial motion therebetween.

The last component are attachment bolts 66. Such attachment bolts extend through the apertures of the collar. Their free ends are threadedly received into threaded apertures aligned therewith and located in the rearward face of the adjustable component for attachment therebetween.

The present invention will pass over and engage at the end of a round steadyrest rod and pull until the machine stops or reverses direction. In the reverse direction, the present invention will then push, at variable adjustable pressure as needed, until the steadyrest stops after the run is completed. Upon stopping, the present invention releases from the rod and the machine continues along over the steadyrest rod up to the steadyrest or as needed, The machine can then reverse direction and travel to the end of the steadyrest rod and engage to start pulling the steadyrest.

The present invention will work at very slow, normal or fast speeds. Using garter springs, depending upon the number of springs and length of springs used, the present invention will engage or disengage with variable pressure as needed. The present invention can be made smaller or larger for light or heavy duty work and will function in the horizontal or vertical position. The present invention being self contained can be adapted to multiple steadyrests and will work in most conceivable situations.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus for coupling concentric cylindrical members through the selective radial enlargement of one of the coupling components comprising, in combination:

a fixed collar having a cylindrical interior bore of a common diameter and with an exterior cross section of varying diameters, an exterior inboard section being of a large diameter, an exterior outboard section being of an intermediate diameter and an exterior intermediate section being of a small diameter, the fixed collar being fabricated of carbon steel and having a plurality of apertures in a circular configuration extending through the inboard section;

an adjustable component having an upper half and a lower half and a central bore extending therethrough with an inboard end forming a flange of an intermediate diameter positionable over the intermediate section of the collar and having a enlarged diameter thereadjacent for being positioned over the outboard section of the collar and having an outboardly tapering intermediate section with its greatest diameter at an outboard end and its smallest diameter at its inboard end joining at its inboard end with the enlarged diameter, the tapered section including an intermediate part of a greater diameter than the sections of the tapering section on opposite sides thereof, the adjustable member being provided with annular grooves on its exterior surface extending from the outboard end to an intermediate location;

an actuator rod located through the bores of the fixed collar and the adjustable component, the actuator rod having an outboard end with a circular cross section of an increased diameter and having downwardly tapering surfaces forwardly and rearwardly thereof, the rearward tapering surface reducing to a diameter equal to the exterior diameter of the remainder of the rod whereby relative axial movement between the rod and to the fixed collar and the adjustable component will allow the tapered surfaces of the rod to interact with the tapered surface of the adjustable component to effect the increasing and decreasing of its diameter;

an elastic garter spring in an annular configuration positionable in at least one of the grooves of the adjustable component to provide a retarding force to the rapid expansion thereof under the influence of the actuator rod; and attachment bolts extending through the collar and threadedly received in threaded apertures of the adjustable component for attachment therebetween.

2. An apparatus for coupling concentric cylindrical members through the selective radial enlargement of one of the coupling components comprising:

a fixed collar having a cylindrical interior bore of a common diameter and with an exterior cross section of varying diameters, an exterior inboard section being of a large diameter, an exterior outboard section being of an intermediate diameter and an exterior intermediate section being of a small diameter, the fixed collar having a plurality of apertures in a circular configuration extending through the inboard section;

an adjustable component having an upper half and a lower half and a central bore extending therethrough with an inboard end forming a flange of an intermediate diameter positionable over the intermediate section of the collar and having a enlarged diameter thereadjacent for being positioned over the outboard section of the collar and having an outboardly tapering intermediate section with its greatest diameter at an outboard end and its smallest diameter at its inboard end joining at its inboard end with the enlarged diameter, the tapered section including an intermediate part of a greater diameter than the sections of the tapering section on opposite sides thereof, the adjustable member being provided with at least one annular groove on its exterior surface; and an actuator rod located through the bores of the fixed collar and the adjustable component, the actuator rod having an outboard end with a circular cross section of an increased diameter and having downwardly tapering surfaces forwardly and rearwardly thereof, the rearward tapering surface reducing to a diameter equal to the exterior diameter of the remainder of the rod.

3. The apparatus as set forth in claim 2 and further including an elastic garter spring in an annular configuration positionable in at least one of the grooves of the adjustable component to provide a retarding force to the rapid expansion thereof under the influence of the actuator rod.

4. The apparatus as set forth in claim 2 and further including attachment bolts extending through the collar and threadedly received in threaded apertures of the adjustable component for attachment therebetween.

* * * * *